United States Patent
Schneider et al.

(10) Patent No.: US 6,937,748 B1
(45) Date of Patent: Aug. 30, 2005

(54) LEFT HAND RIGHT HAND INVARIANT DYNAMIC FINGER POSITIONING GUIDE

(75) Inventors: John K. Schneider, Snyder, NY (US); Stephen M. Gojevic, Tonawanda, NY (US); Frank W. Keeney, Williamsville, NY (US); Frederick W. Kiefer, Williamsville, NY (US)

(73) Assignee: Ultra-Scan Corporation, Amherst, NY (US)

( * ) Notice: Subject to any disclaimer, the term of this patent is extended or adjusted under 35 U.S.C. 154(b) by 426 days.

(21) Appl. No.: 09/659,772

(22) Filed: Sep. 11, 2000

Related U.S. Application Data
(60) Provisional application No. 60/153,180, filed on Sep. 10, 1999.

(51) Int. Cl.$^7$ .............................................. G06K 9/00
(52) U.S. Cl. ................................................... 382/126
(58) Field of Search .............................. 382/115, 124, 382/126; 283/68; 356/71; 235/380; 340/5.8–5.86; 704/246, 273; 902/4, 25

(56) References Cited

U.S. PATENT DOCUMENTS

| | | | | |
|---|---|---|---|---|
| 3,576,538 A | * | 4/1971 | Miller ........................ | 235/380 |
| 3,584,958 A | * | 6/1971 | Miller et al. .................. | 356/71 |
| 3,614,737 A | * | 10/1971 | Sadowsky .................... | 382/115 |
| 3,668,633 A | * | 6/1972 | Sadowsky .................... | 382/126 |
| 3,804,524 A | * | 4/1974 | Jocoy et al. ................. | 356/138 |
| 4,357,597 A | * | 11/1982 | Butler ......................... | 382/115 |
| 5,177,802 A | * | 1/1993 | Fujimoto et al. ........... | 382/124 |
| 5,483,601 A | * | 1/1996 | Faulkner ..................... | 382/115 |
| 6,198,836 B1 | * | 3/2001 | Hauke ......................... | 382/125 |

* cited by examiner

*Primary Examiner*—Samir Ahmed
(74) *Attorney, Agent, or Firm*—Hodgson Russ LLP

(57) ABSTRACT

An automatic finger guide for fingerprint scanners includes active scan area on the scanner surface upon which one finger rests and a non-active scan area on the scanner surface on which the other finger(s) rest to provide stability, a stop post to indicate how far forward to place the hand, a guide post to assist in positioning the finger left to right or right to left as the case may be, sensors on the post to provide feedback to the user to when the hand is properly in place and to determine the position as to where the finger comes to rest on the active scan area.

7 Claims, 6 Drawing Sheets

USER FINGER POSITION
FEEDBACK DISPLAY

MOVABLE FINGER GUIDE FOR
USE WITH SOLID STATE SCANNER

LEFT HAND RIGHT HAND INVARIANT DYNAMIC FINGER POSITIONING GUIDE

CROSS REFERENCE TO A RELATED APPLICATION

Applicants hereby claim priority based on Provisional Application No. 60/153,180 filed Sep. 10, 1999 and entitled "Left Hand Right Hand Invariant Dynamic Finger Positioning Guide" which is incorporated herein by reference.

BACKGROUND OF THE INVENTION

Inkless fingerprint scanners, also known as live scan fingerprint readers or biometric devices, have been widely used for many years. These systems obtain an image of the fingerprint without the use of inks. Once an image is acquired, it is then processed and an identification or verification of the individual's identity is made.

Many different techniques have been used to obtain an image of the finger including optical scanners, thermal scanners, capacitive scanners, E-field sensors, ultrasonic scanners, and many more. Each uses a different modality or technique to image the same physical characteristic; the ridge structure of the finger. Each claim to have certain advantages over the competing approaches.

The use of these systems is a two step process. The first step is that the user must enroll into the system. The enrollment process scans the individual's finger for the first time and stores it, along with any other pertinent information needed for future use in the identification or verification process. The second step is the actual identification or verification process. In the case of identification, the user's identity is now known and it is up to the system to determine the identity. This process is usually referred to as a cold search or a one-to-many. The verification process is where the user presents their identity in the form of a token such as a PIN code, ID Card, etc., and it is up to the system to verify the identity using the fingerprint.

The majority of large-scale applications that have been attempted with live scan fingerprint readers have been in an attended application. That is, a trained attendant assists the user of the live scan fingerprint reader by guiding the user in the proper placement of the finger with respect to vertical and horizontal position on the platen surface of the live scan fingerprint reader. Proper placement of the finger is absolutely critical to obtain maximum accuracy in the identification or verification process. Usually, a display such as a computer monitor is used to show the location of the finger on the platen, providing feedback to the user and the attendant as to the position of the finger. In addition to proper placement of the finger horizontally and vertically, users often tend to roll the finger to one side or another, thereby not imaging the main portion of the finger but rather the side of the finger. Consequently, the attendant will often assist in ensuring that the finger is flat on the fingerprint platen and not rolled off to one side.

Using an attendant to assist the user and providing visual feedback of the image severely limits the deployment of these systems. For example, for most commercial applications the cost of a trained fingerprint attendant to assist the user in the positioning of their finger is prohibitive. Techniques to train the users on the proper placement of the finger have been tried but generally do not work. Even if they did, adding a PC Monitor near the fingerprint scanner to provide positional feedback also raises the cost of the system beyond what can be tolerated by most commercial applications. Furthermore, the visual feedback system introduces additional problems.

First, the user, by seeing the finger on the PC Monitor, will tend to slide their finger into position until it is properly located. Because of the friction between the skin and the platen, the sliding effect introduces distortion of the fingerprint, thereby introducing errors in the identification/verification process.

Second, many live-scan fingerprint readers cannot produce an image of the finger fast enough to give the user the instantaneous feedback they need to guide them. For these scanners, the use of a display such as a PC Monitor is virtually useless.

In an attempt to solve this problem, some of these products have tried a form of electrical or mechanical guide to assist the user in the proper placement of the finger. Electrical guides are normally some type of sensor or array of sensors that is detecting the position of the finger on the platen surface and providing the user feedback. Again, these devices would have the same problem associated with them as does the PC Monitor. The user would slide their finger to position it properly as instructed by the positioning sensor, and this sliding would again cause distortion of the fingerprint. Other electronic means have been proposed to image a very large surface area, thereby ensuring that the entire finger would be imaged. Then using image-processing techniques, the tip of the finger would be located for processing the fingerprint image. Unfortunately, for many fingerprint scanners, imaging a large scan area would cause the image array such as a CCD to increase in size, thereby increasing the cost of the system significantly. For other fingerprint scanners, increasing the image area would increase the scan time significantly thereby reducing user acceptance and system throughout.

Stationary mechanical devices have been tried but have proven ineffective. The variability in the length, width and height of fingers makes it difficult to design a single guide to work for everyone. In addition, many proposed techniques have proven inappropriate due to the variability in the length of an individual's fingernails.

These problems combined have restricted the deployment of live scan fingerprint readers successfully into unattended applications.

SUMMARY OF THE INVENTION

An overall improvement can be made to all live scan fingerprint readers by providing the automatic guide in accordance with the present invention for properly positioning the finger horizontally, vertically, and without rotation. Doing so will ensure that the user's finger will be in the optimum position of the fingerprint platen, without distortion, thereby enabling the highest possible system accuracy. Furthermore, the system is able to do this without the help of the user, an attendant, or a display such as a PC Monitor. This makes the system user friendly and low cost, thereby enabling the use of these devices in unattended applications.

The automatic finger guide of the present invention includes an active scan area on the scanner surface upon which one finger rests and a non-active scan area on the scanner surface on which the other finger(s) rest to provide stability, a stop post to indicate how far forward to place the hand, a guide post to assist in positioning the finger left to right or right to left as the case may be, sensors on the post to provide feedback to the user as to when the hand is properly in place and means to determine the position as to where the finger comes to rest on the active scan area.

The following detailed description of the invention, when read in conjunction with the accompanying drawings, is in such full, clear, concise and exact terms as to enable any person skilled in the art to which it pertains, or with which it is most nearly connected, to make and use the invention.

DETAILED DESCRIPTION OF THE ILLUSTRATED EMBODIMENTS

Figures 1A, 1B:
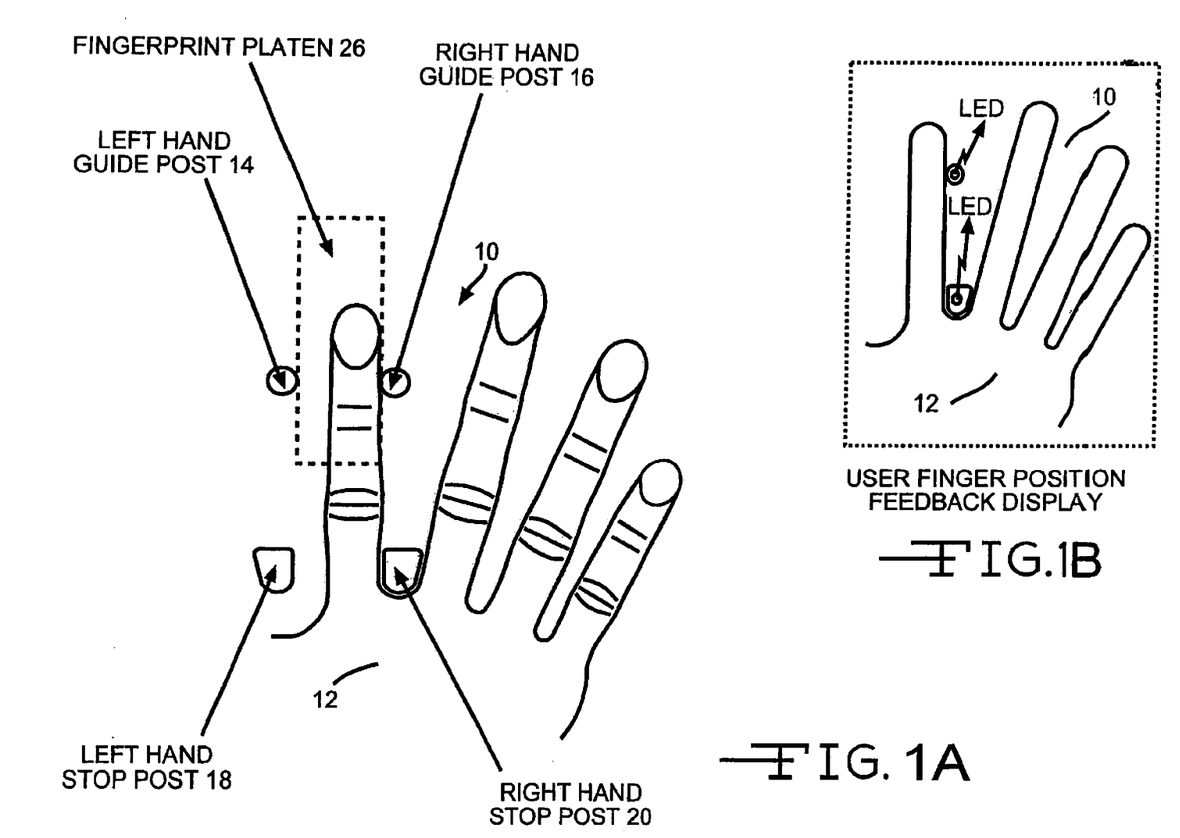
FIGS. 1A and 1B are diagrammatic views illustrating the automatic finger guide according to the present invention.

An overall improvement can be made to all live scan fingerprint readers by providing the automatic guide as shown in FIGS. 1A and 1B for properly positioning the finger horizontally, vertically, and without rotation. Doing so will ensure that the user's finger will be in the optimum position of the fingerprint platen, without distortion, thereby enabling the highest possible system accuracy. Furthermore, the system is able to do this without the help of the user, an attendant, or a display such as a PC Monitor. This makes the system user friendly and low cost, thereby enabling the use of these devices in unattended applications.

The fundamental approach for use in an unattended, verification mode of operation is as follows:

First, increase the size of the surface of the fingerprint scanner to allow two or more fingers to be placed down simultaneously. One finger would rest on the active scan area (platen), the other(s) would rest on an ordinary surface (non-active scan area) to provide stability. This greatly minimizes the amount of rotation that can be introduced since any rotation would tend to lift the hand off the surface of the scanner.

Second, provide posts to assist the user in placement of the hand. Two posts as a minimum would work. One to indicate how far forward to place the hand (the stop post), and one to help position the finger left to right (the guidepost). A mirror image of the posts could be placed to allow left hand/right hand operation.

Third, place electronic sensors on the post to provide feedback to the user as to when they have their hand properly in place. The feedback could be visual such as LEDs, audible, or both.

Fourth, the position as to where the finger comes to rest on the platen can then be determined. This can be done manually, or automatically by the system through a variety of image processing techniques.

The arrangement shown in FIGS. 1A and 1B is provided on the operative surface of a fingerprint scanner, typically the top surface 10 of the scanner. The scanner can be any of the types previously mentioned hereinabove. With the above functionality built into the system, the enrollment and verification process would work in the following manner. In the enrollment process, the user places their left or right hand 12 down onto the surface 10 of the fingerprint scanner and ensures proper finger placement against the guide post 14 or 16 and stop post 18 or 20 as indicated by feedback sensors. The system scans a large portion of the finger on the scanner platen 26 and determines the location of the tip of the finger. The large portion of the finger must only be scanned during the time of enrollment in order to ensure that the tip of the finger is located and the complete fingerprint image is captured. This increased scan time during the enrollment process is not needed during the verification process and would therefore be accepted by the users of the system. The system records the fingerprint image or template, the location of the tip of the finger, and any other pertinent information such as PIN code.

Figure 2:
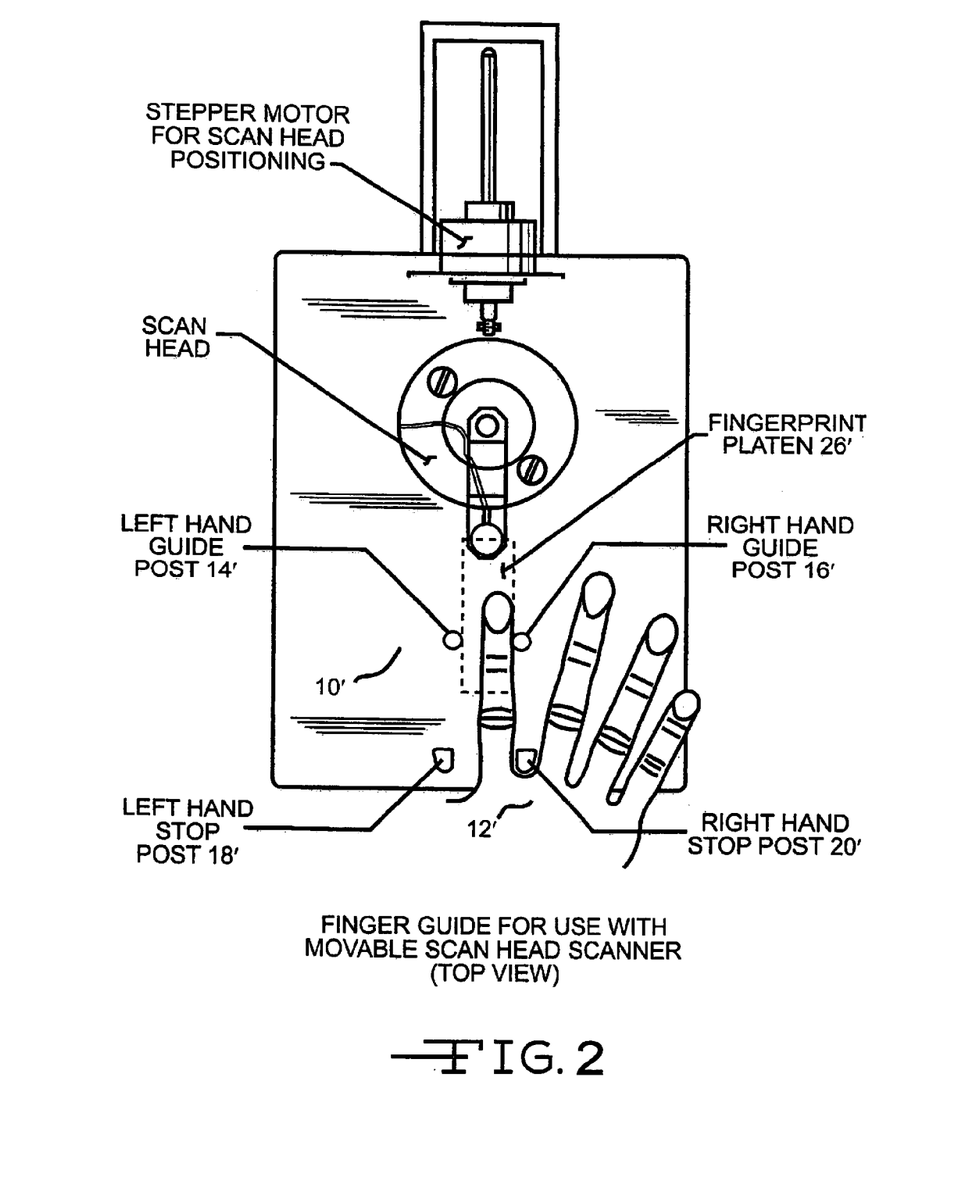
FIG. 2 is a top plan view, partly diagrammatic, of the finger guide of the present invention for use with one type of scanner.
Figure 3:
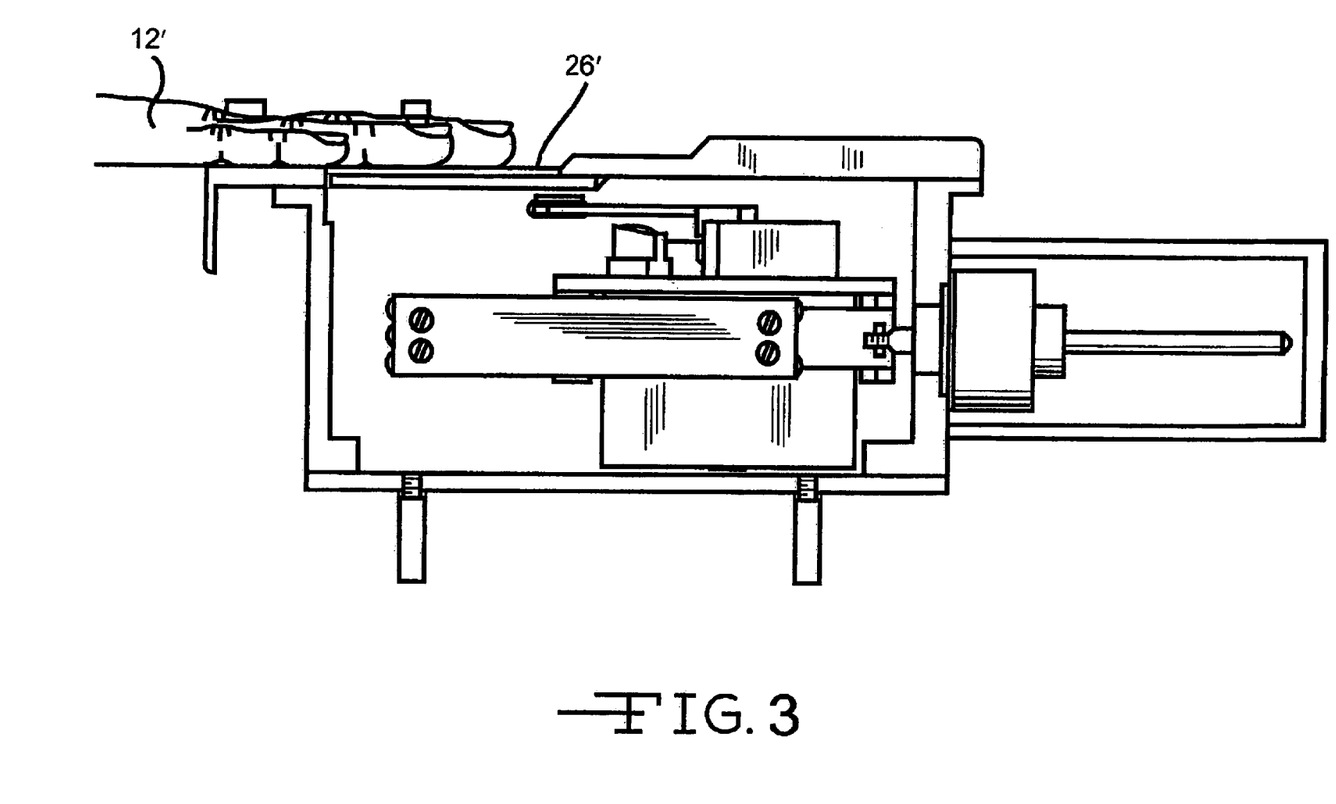
FIG. 3 is a side elevantional view, with parts removed, of the apparatus of FIG. 2.
Figure 4:
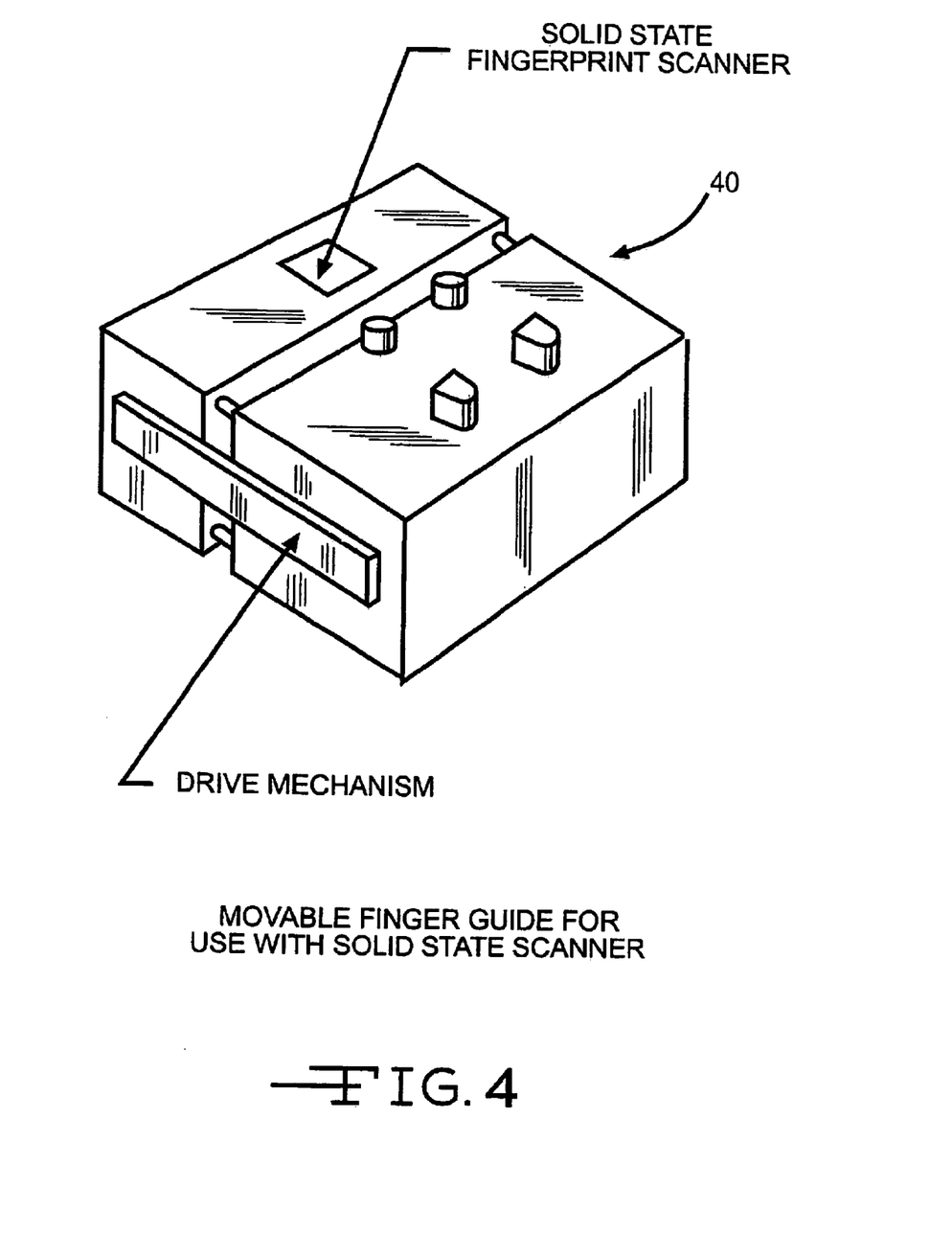
FIG. 4 is a perspective view of the finger guide of the present invention for use with another type of scanner.

There are two fundamental approaches to implement the verification process. The first approach is ideally suited for fingerprint scanners that scan the finger mechanically, such as the ultrasonic scanner 30 shown in FIGS. 2 and 3. By way of example, the scanner of FIGS. 2 and 3 is similar to that shown and described in U.S. Pat. No. 5,647,364 issued Jul. 15, 1997, the disclosure of which is hereby incorporated by reference. The second approach is ideally suited for scanners 40 that do not scan the finger mechanically as shown in FIG. 4

The verification process for mechanical scanners is as follows. The user enters their token ID such as the PIN code recorded at the time of enrollment. The system retrieves the fingerprint information that is to be compared, along with the location of the tip of the finger. The system, using a stepper motor or other motion controlling type of device, positions the scan head to the proper position under the platen for that individual in order to scan the finger. Since the scan head is in an optimum position, only a normal size area of the finger needs to be scanned, thereby minimizing the scan time. The user places their left or right hand down onto the surface of the fingerprint scanner as they did during enrollment and ensures proper finger placement against the guide post and stop post as indicated by the feedback sensors. The finger is scanned and the identity verification process takes place.

The verification process for non-mechanical scanners is as follows.

For live scan fingerprint readers that do not scan the finger mechanically, moving the solid state imaging array to directly under the finger may or may not be feasible. In that case, rather than moving the imaging array to position it under the finger, the guide post and stop post could be moved and the image array kept stationary. In this manner, the end result is the same in that the tip of the finger rests directly over the imaging sensor.

In addition to the obvious advantages the finger guide has in an unattended verification mode of operation, there are even advantages when used in a non-verification mode or operations, i.e., a cold search application. The accuracy and speed of identifying an individual is directly related to finger placement on the platen. In order to compare two images, the matching algorithm must allow for translation and rotation. The tighter the control on these two degrees of freedom, the faster a match can be performed, with greater accuracy.

In this case, the enrollment process would store both the fingerprint image and the location on the platen where the finger was found. The second parameter, the location on the platen where the finger was found, is directly related to the length of the finger as measured from the length of the stop post to the tip of the scanned image. Therefore, it can be used as a discriminator into the large database of fingerprint images. Thus when an individual is to be identified, they place their finger down onto the platen. The system would not automatically search for the top of the finger and begin scanning. Only the portion of the database associated with that particular length of finger would have to be searched, thereby not only improving accuracy (less images to search), but also decreasing the overall search time.

There are some fingerprint scanners on the market that simultaneously scan more than one finger. An approach similar to that of the present invention could be used to assist in the placement of the fingers on such scanners.

Figures 5, 6A, 6B:
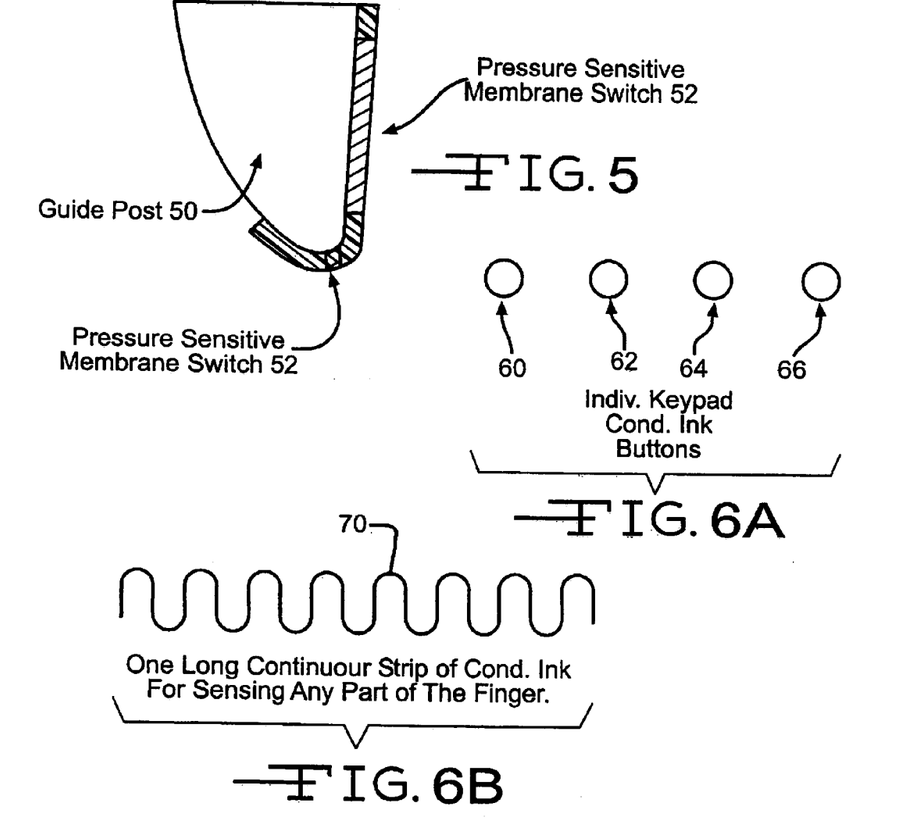
FIG. 5 is a diagrammatic view further illustrating an alternative form of guide post of the finger guide of the present invention.
FIGS. 6A–6C are diagrammatic views illustrating alternative finger sensing arrangements for use in the finger guide of the present invention.

In the embodiment of FIGS. 1–4, the guide post and the stop post both are of metal, and when the finger properly contacts both an electrical circuit is completed to indicate that the finger is properly positioned on the scanner. FIG. 5 shows an alternative form of guide post provided with a pressure sensitive membrane type switch 52 located along the surface of the guide post which is to be contacted by the finger. The arrangement can be elongated and comprising a pair of pads of conductive ink. Alternative approaches such as impedance, resistive or capacitive switches and infrared sensitive elements also can be employed.

Figure 6C:
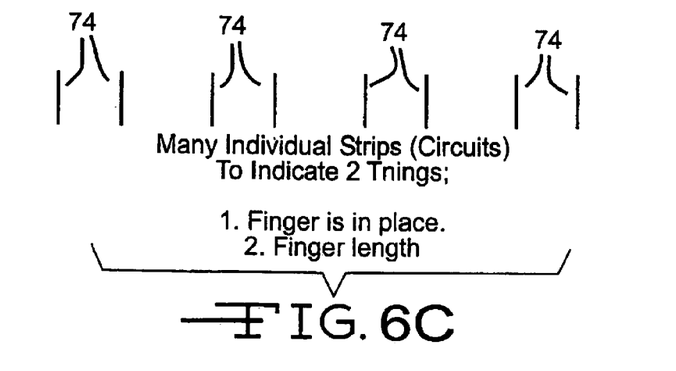

FIGS. 6A–6C illustrate alternative finger sensing arrangements for use in the finger guide of the present invention. Each of the arrangements is in the form of a membrane switch construction and would be located on a surface of the scanner in relation to the active scan area. The arrangement of FIG. 6A includes a series of individual keypad conductive ink buttons 60, 62, 64 and 66 along a row or substantially linear path. FIG. 6B illustrates a single long continuous strip 70 of conductive ink for sensing any part of the finger. FIG. 6C shows an arrangement of many individual strips 74 (circuits) which functions to indicate whether or not the finger is in place and to provide an indication of the finger length. The strips are along a row or substantially linear path.

Figure 7:
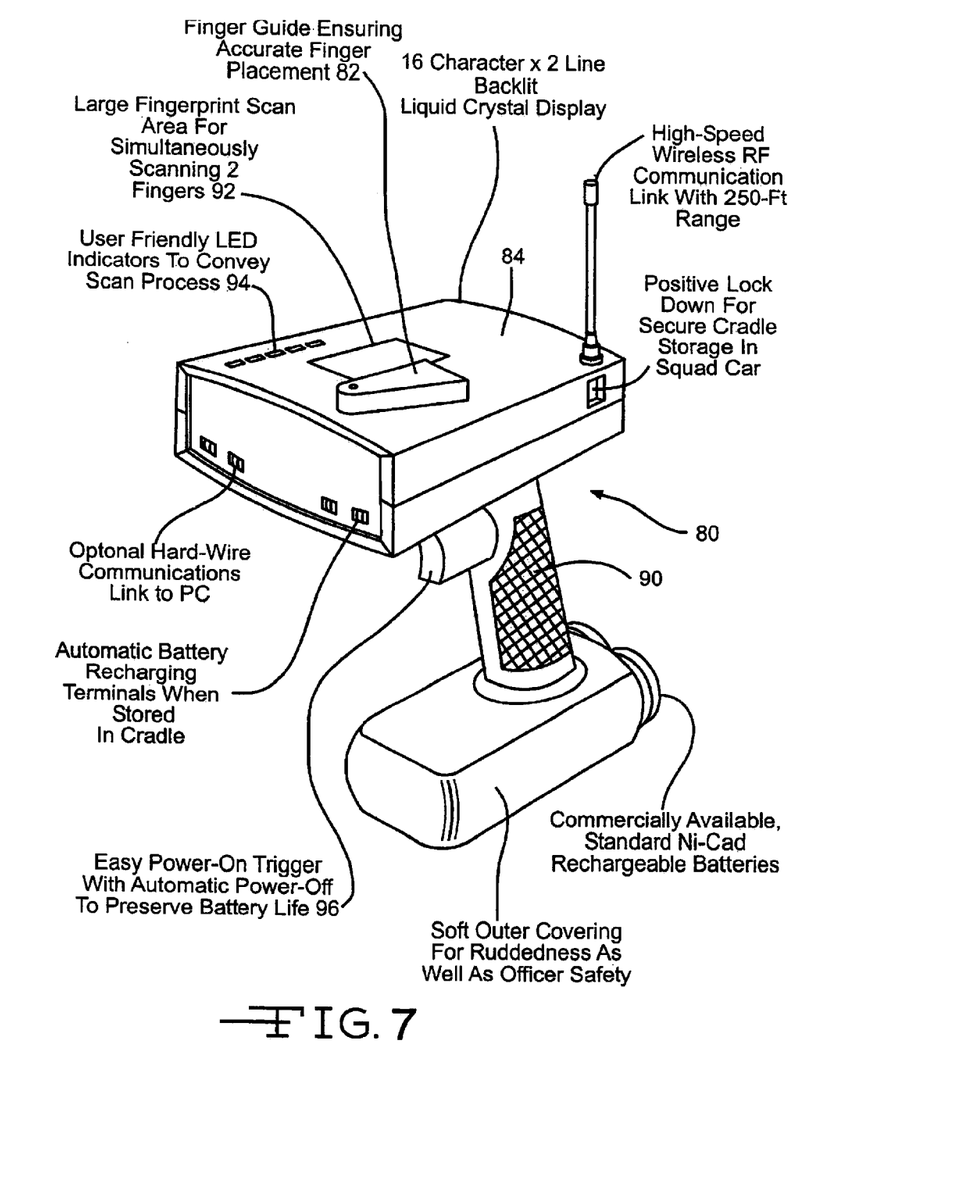
FIG. 7 is a perspective view of the finger guide of the present invention used in another type of scanner

FIG. 7 shows the finger guide of the present invention in a portable fingerprint scanner 80 adapted primarily for law enforcement use. The finger guide post 82 is located on the top surface 84 of the scanner in relation to the fingerprint scan area. The scanner can be of the type shown in the above-referenced U.S. Pat. No. 5,647,364 adapted for battery operation. The scanner can be connected to a computer in the law enforcement vehicle either via the hard wire connection or the RF communication link indicated in FIG. 7. That is for the purpose of storing and processing the fingerprint images down-loaded from the scanner. In operation, the device is held by the law enforcement officer by means of the handle 90, the subject places his finger on the scanner including the scan area or platen 92 and when the finger is properly positioned an indication is provided by the LED 94 as previously described, whereupon the scanner is activated by the officer simply by squeezing the trigger 96 and if a fingerprint image is obtained this is indicated by another LED.

It is therefore apparent that the present invention accomplishes its intended objectives. While embodiments of the present invention have been described in detail, that is done for the purpose of illustration, not limitation.

What is claimed is:

1. An automatic finger positioning guide for fingerprint scanners comprising:
   a) an active scan area on the scanner surface upon which one finger rests and a non-active area on the scanner surface on which one or more of the other fingers rest to provide stability;
   b) a stop post on the scanner surface to indicate how far to place the hand longitudinally thereof, the stop post being located on the scanner surface in relation to the active scan area so as to contact the vertex defined between the side of the one finger and the side of an adjacent finger when the hand is properly in place;
   c) a guide post on the scanner surface physically separate from the stop post to assist in positioning the finger laterally, the guide post being located on the scanner surface in relation to the active scan area so as to contact a portion of the side of the finger at a location between the stop post and the finger tip when the hand is properly in place; and
   d) means to indicate when the hand is properly in place.

2. The finger positioning guide according to claim 1, wherein pressure sensitive membrane switches are provided on the stop post and on the guide post.

3. The finger positioning guide according to claim 1, wherein left-hand and right-hand guide posts and stop posts are provided on the scanner surface.

4. The finger positioning guide according to claim 1, further including a visual indicator on the scanner operatively connected to the means to indicate when the hand is properly in place.

5. The finger positioning guide according to claim 1, wherein a sensor is on at least one of the posts to indicate when the hand is properly in place.

6. The finger positioning guide according to claim 1, wherein the stop post and the guide post are so located relative to each other on the scanner surface so that the guide post contacts the same side of the one finger the vertex of which is contacted by the stop post.

7. An automatic finger positioning guide for fingerprint scanners comprising:
   a) an active scan area on the scanner surface upon which one finger rests and a non-active area on the scanner surface on which one or more of the other fingers rest to provide stability;
   b) a stop post on the scanner surface to indicate how far to place the hand longitudinally thereof, the stop post being located on the scanner surface in relation to the active scan area so as to contact the vertex defined between the side of the one finger and the side of an adjacent finger when the hand is properly in place;
   c) a guide post on the scanner surface to assist in positioning the finger laterally, the guide post being located on the scanner surface in relation to the active scan area so as to contact a portion of the side of the finger at a location between the stop post and the finger tip when the hand is properly in place;
   d) means to indicate when the hand is properly in place; and
   e) the stop post and the guide post being of electrically conductive material so that a circuit is completed when the hand is properly in place.

* * * * *

UNITED STATES PATENT AND TRADEMARK OFFICE
CERTIFICATE OF CORRECTION

| | | |
|---|---|---|
| PATENT NO. | : 6,937,748 B1 | Page 1 of 1 |
| APPLICATION NO. | : 09/659772 | |
| DATED | : August 30, 2005 | |
| INVENTOR(S) | : John K. Schneider | |

It is certified that error appears in the above-identified patent and that said Letters Patent is hereby corrected as shown below:

TITLE PAGE;

Should read - (*)     Subject to any disclaimer, the term of this patent is extended or adjusted under 35 U.S.C. 154(b) by 388 days.

Signed and Sealed this

Fifth Day of June, 2007

JON W. DUDAS
*Director of the United States Patent and Trademark Office*